(12) United States Patent
Bansal et al.

(10) Patent No.: US 9,354,687 B2
(45) Date of Patent: *May 31, 2016

(54) METHODS AND APPARATUS FOR UNSUPERVISED WAKEUP WITH TIME-CORRELATED ACOUSTIC EVENTS

(71) Applicant: NUANCE COMMUNICATIONS, INC., Burlington, MA (US)

(72) Inventors: Dhananjay Bansal, Cambridge, MA (US); Michael J. Newman, Somerville, MA (US); Paul van Mulbregt, Wayland, MA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/483,282

(22) Filed: Sep. 11, 2014

(65) Prior Publication Data

US 2016/0077574 A1 Mar. 17, 2016

(51) Int. Cl.
*G10L 21/00* (2013.01)
*G06F 1/32* (2006.01)
*G10L 15/22* (2006.01)
*G10L 25/51* (2013.01)

(52) U.S. Cl.
CPC .............. *G06F 1/3215* (2013.01); *G10L 15/22* (2013.01); *G10L 25/51* (2013.01); *G10L 2015/223* (2013.01)

(58) Field of Classification Search
CPC ......... G10L 15/00; G10L 15/01; G10L 15/06; G10L 15/065; G10L 15/08; G10L 15/14; G10L 15/1822; G10L 15/20; G10L 15/24; G10L 15/265

USPC ............. 704/275, 270, 270.1, 274, 231
See application file for complete search history.

(56) References Cited

U.S. PATENT DOCUMENTS

| | | | |
|---|---|---|---|
| 5,465,317 A | 11/1995 | Epstein | |
| 6,697,782 B1 | 2/2004 | Iso-Sipila | |
| 8,682,525 B1* | 3/2014 | Kalinadhabhotla | .... G07C 5/008 340/442 |
| 2003/0040907 A1 | 2/2003 | Chang et al. | |
| 2005/0080627 A1 | 4/2005 | Hennebert et al. | |
| 2013/0289994 A1 | 10/2013 | Newman et al. | |
| 2014/0012586 A1* | 1/2014 | Rubin | ....................... G10L 25/51 704/273 |

(Continued)

OTHER PUBLICATIONS

PCT International Search Report and Written Opinion of the ISA dated Oct. 30, 2015; For PCT App. No. PCT/US2015/040341; 9 pages.

(Continued)

*Primary Examiner* — Qi Han
(74) *Attorney, Agent, or Firm* — Daly, Crowley Mofford & Durkee, LLP (57) ABSTRACT

Methods and apparatus for unsupervised wakeup of a device including receiving a first acoustic event at a first time and a second acoustic event at a second time, wherein the first and second acoustic events have scores above a first threshold identifying the first and second acoustic events as wakeup candidates for a wakeup phrase for an unsupervised wakeup of a device. It can be determined that the first acoustic event score is below a second threshold, which is higher than the first threshold and whether a difference between the first and second times is within a range to check for correlation in time between the first and second acoustic events. Occurrence of a wakeup event can be determined based upon the first and second times.

20 Claims, 8 Drawing Sheets

(56) References Cited

U.S. PATENT DOCUMENTS

| | | | |
|---|---|---|---|
| 2014/0149754 A1* | 5/2014 | Silva | G06F 1/3212 |
| | | | 713/300 |
| 2014/0249817 A1 | 9/2014 | Hart et al. | |
| 2015/0039310 A1* | 2/2015 | Clark | G10L 15/063 |
| | | | 704/244 |
| 2015/0256914 A1* | 9/2015 | Wiesbauer | H04R 3/00 |
| | | | 381/174 |

OTHER PUBLICATIONS

U.S. Appl. No. 14/483,285, filed Sep. 11, 2014, Bansal, et al.

U.S. Appl. No. 14/483,285 Amendment filed Feb. 18, 2016, 13 pages.

Office Action dated Nov. 19, 2015; For Pat. App. No. 14/483,285; 15 pages.

* cited by examiner

METHODS AND APPARATUS FOR UNSUPERVISED WAKEUP WITH TIME-CORRELATED ACOUSTIC EVENTS

BACKGROUND

As is known in the art, computer speech recognition (a.k.a., automatic speech recognition or ASR) is the process of automatically converting spoken words into text by a computer. Illustrative applications of ASR include speech transcription, speech translation, voice control of devices, etc. Speech recognition systems operate by matching the acoustics with acoustic signatures of words. These acoustic signatures, also known as acoustic models, are trained using a large amount of training data. Generally, this training data is collected from a large number of different speakers to make an ASR system that can recognize audio from a wide range of speakers (a.k.a. speaker independent ASR system). It is known that such generic acoustic models, though performing well on a wide range of users, may not perform as well on a given user compared to an acoustic model trained over just that user. To match the acoustic model to a specific user, in practice, an ASR system may adapt its generic acoustic model using a small amount of audio data from a target speaker to create a speaker specific acoustic model that performs significantly better than a generic acoustic model. This process is referred to as acoustic model adaptation or speaker adaptation.

Acoustic model adaptation can be performed as supervised or unsupervised. In both cases, the ASR system uses audio files from the target user(s) and corresponding transcriptions. In supervised adaptation, the correctness of the transcription is verified by a human, explicitly or implicitly. In unsupervised model adaptation, the system uses a transcription that is automatically generated without explicit human verification. In unsupervised adaptation, the transcription may be incorrect, and adapting on incorrect transcription can potentially degrade performance. Minimizing incorrect adaptation is one challenge for unsupervised adaptation.

Today, one application of speech recognition technology is to allow voice commands to "wake up" a "sleeping" device. Some of today's devices, such as smartphones and televisions, are designed to enter a sleep mode to conserve power when not actively used for some period of time. Once such devices go into sleep mode, they must be first "woken up" to perform a task, such as making a call in case of a smartphone, or showing a particular channel in case of a television. Traditionally, a device is woken up using a press of a button. In voice-based wakeup, a device can be woken up using a voice command. The advantage of using voice to wake up a device is that the user does not need to physically locate and touch the device. For example, for a television, the user can just say "Wake up TV" and the television wakes up, and then the user can say "Show CNN" without the user having to power on the television explicitly. In this case, "Wake up TV" is the wakeup phrase.

In a voice-based wakeup task the device, though sleeping, is constantly listening to the ambient audio for a pre-specified phrase or set of wakeup phrases. When the device detects a wakeup phrase, it wakes up and is ready to perform tasks.

There are a number of possible outcomes in a voice-based wakeup system:
 1) Correct Accept (CA), in which the user speaks a wakeup phrase, and the device correctly recognizes it.
 2) False Accept (FA) is when non-wakeup audio is recognized as a wakeup, and the device falsely wakes up.
 3) Correct Reject (CR) is when the non-wakeup audio is correctly rejected.
 4) False Reject (FR) is when the system fails to recognize a wakeup request from the user.

One of the challenges of voice-based wakeup systems is that the ratio of wakeup audio to background can be very small. For example, in a typical scenario, a system can be listening for several hours, before a single wakeup is issued. For the single instance of wakeup audio that needs to be detected, there are several hours of background audio that must be rejected. Such voice-based wakeup systems are tuned to reject aggressively to minimize false accepts (FAs). Anything that does not closely match the acoustic signature of the wakeup phrase is rejected. However, this can potentially result in high false-reject (FR) rates, especially for non-native users, or in noisy conditions, as the acoustic signature of the wakeup phrase may not closely match the one in the acoustic model.

It is known that acoustic model adaptation to the target user yields a significant reduction in FRs. In many current systems using voice-based wakeup, acoustic model adaptation takes place during a supervised user enrollment session. In supervised enrollment, the system prompts the user to speak a particular wakeup phrase a few times (typically three). Using the audio examples provided by the user, the system adapts the recognition models, improving the wakeup performance significantly for that user. This adaptation is supervised in the sense that the user speaks the phrase prompted by the system. (In addition, an automatic rejection scheme will prevent the system from triggering on non-speech events.)

However, a supervised enrollment method such as this has various limitations. For example, it requires explicit user interaction with the device, which may not be preferred by all users. On some devices, the interface required may not be present. In addition, supervised enrollment is feasible only on a small set of phrases. Enrolling on many phrases to obtain the gain from speaker adaptation on these may be relatively user unfriendly and time consuming. Further, supervised enrollment often happens in a single session and captures only a single acoustic environment, and the gains are greatest for matched acoustic conditions, i.e., if a user enrolled using a specific prosody, or in specific noise conditions, then the enrolled models will not perform as well on mismatched conditions. That is, if the enrollment happened in a quiet environment and the user tries to wake the system in a noisy car, the wake-up may not work as well as in a quiet, clean environment. Supervised enrollment may also be clumsy when multiple users need to be enrolled such as for a TV, where multiple family members may use the system.

SUMMARY

Embodiments of the invention provide methods and apparatus for unsupervised user adaptation where a system automatically identifies utterances on which to adapt from normal usage by a user. Embodiments of the invention are well-suited for tasks where the same phrase is repeatedly spoken by the user, such as voice-based wakeup or commands (e.g., call, send text, open calendar). Embodiments of unsupervised adaptation have various benefits over supervised enrollment. Unsupervised enrollment can be used to adapt on multiple phrases and commands, and can enroll multiple users without extra effort from the user(s). Performing such adaptation using supervised enrollment may be time consuming for the user and may lead to a poor user experience. As the system adapts on actual usage data in unsupervised adaptation, the performance may be better than conventional static enrollment where the enrollment and usage data may differ in acoustics.

In one aspect of the invention, a method comprises: receiving a first acoustic event at a first time and a second acoustic event at a second time, wherein the first and second acoustic events have scores above a first threshold identifying the first and second acoustic events as wakeup candidates for a wakeup phrase for an unsupervised wakeup of a device; determining that the first acoustic event score is below a second threshold, which is higher than the first threshold; and determining whether a difference between the first and second times is within a range to check for correlation in time between the first and second acoustic events; and determining that a wakeup event has occurred based upon the first and second times.

The method can further include one or more of the following features: determining whether the first and second acoustic events are acoustically similar and determining that the wakeup event has occurred based upon the first and second times and the determination of acoustic similarity, adapting an acoustic model on the first and/or second acoustic event based on the acoustic similarity determination of the first and second acoustic events, adapting an acoustic model on a lower scoring one of the first and second acoustic events, an upper limit of the range is less than or equal to about fifteen seconds, a lower limit of the range is greater than or equal to about three seconds, using a main processor and a lower power processor to provide the unsupervised wakeup, the lower power processor identifies the first wakeup candidate, and/or receiving a textual input of the wakeup phrase.

In another aspect of the invention, an article comprises: a non-transitory computer readable medium having stored instructions that enable a machine to: receive a first acoustic event at a first time and a second acoustic event at a second time, wherein the first and second acoustic events have scores above a first threshold identifying the first and second acoustic events as wakeup candidates for a wakeup phrase for an unsupervised wakeup of a device; determine that the first acoustic event score is below a second threshold, which is higher than the first threshold; and determine whether a difference between the first and second times is within a range to check for correlation in time between the first and second acoustic events; and determine that a wakeup event has occurred based upon the first and second times.

The article can further include one or more of the following features: determining whether the first and second acoustic events are acoustically similar and determining that the wakeup event has occurred based upon the first and second times and the determination of acoustic similarity, adapting an acoustic model on the first and/or second acoustic event based on the acoustic similarity determination of the first and second acoustic events, adapting an acoustic model on a lower scoring one of the first and second acoustic events, an upper limit of the range is less than or equal to about fifteen seconds, a lower limit of the range is greater than or equal to about three seconds, using a main processor and a lower power processor to provide the unsupervised wakeup, the lower power processor identifies the first wakeup candidate, and/or receiving a textual input of the wakeup phrase.

In a further aspect of the invention, a system comprises: a processor and a memory configured to: receive a first acoustic event at a first time and a second acoustic event at a second time, wherein the first and second acoustic events have scores above a first threshold identifying the first and second acoustic events as wakeup candidates for a wakeup phrase for an unsupervised wakeup of a device; determine that the first acoustic event score is below a second threshold, which is higher than the first threshold; and determine whether a difference between the first and second times is within a range to check for correlation in time between the first and second acoustic events; and determine that a wakeup event has occurred based upon the first and second times.

The system can further include one or more of the following features: determining whether the first and second acoustic events are acoustically similar and determining that the wakeup event has occurred based upon the first and second times and the determination of acoustic similarity, adapting an acoustic model on the first and/or second acoustic event based on the acoustic similarity determination of the first and second acoustic events, adapting an acoustic model on a lower scoring one of the first and second acoustic events, an upper limit of the range is less than or equal to about fifteen seconds, a lower limit of the range is greater than or equal to about three seconds, using a main processor and a lower power processor to provide the unsupervised wakeup, the lower power processor identifies the first wakeup candidate, and/or receiving a textual input of the wakeup phrase.

BRIEF DESCRIPTION OF THE DRAWINGS

The foregoing features of this invention, as well as the invention itself, may be more fully understood from the following description of the drawings in which:

FIG. 3d is a flow diagram showing a sequence of steps for processing a second type of event for unsupervised wakeup with wakeup candidates correlated in time and acoustically similar;

DETAILED DESCRIPTION

Figure 1:
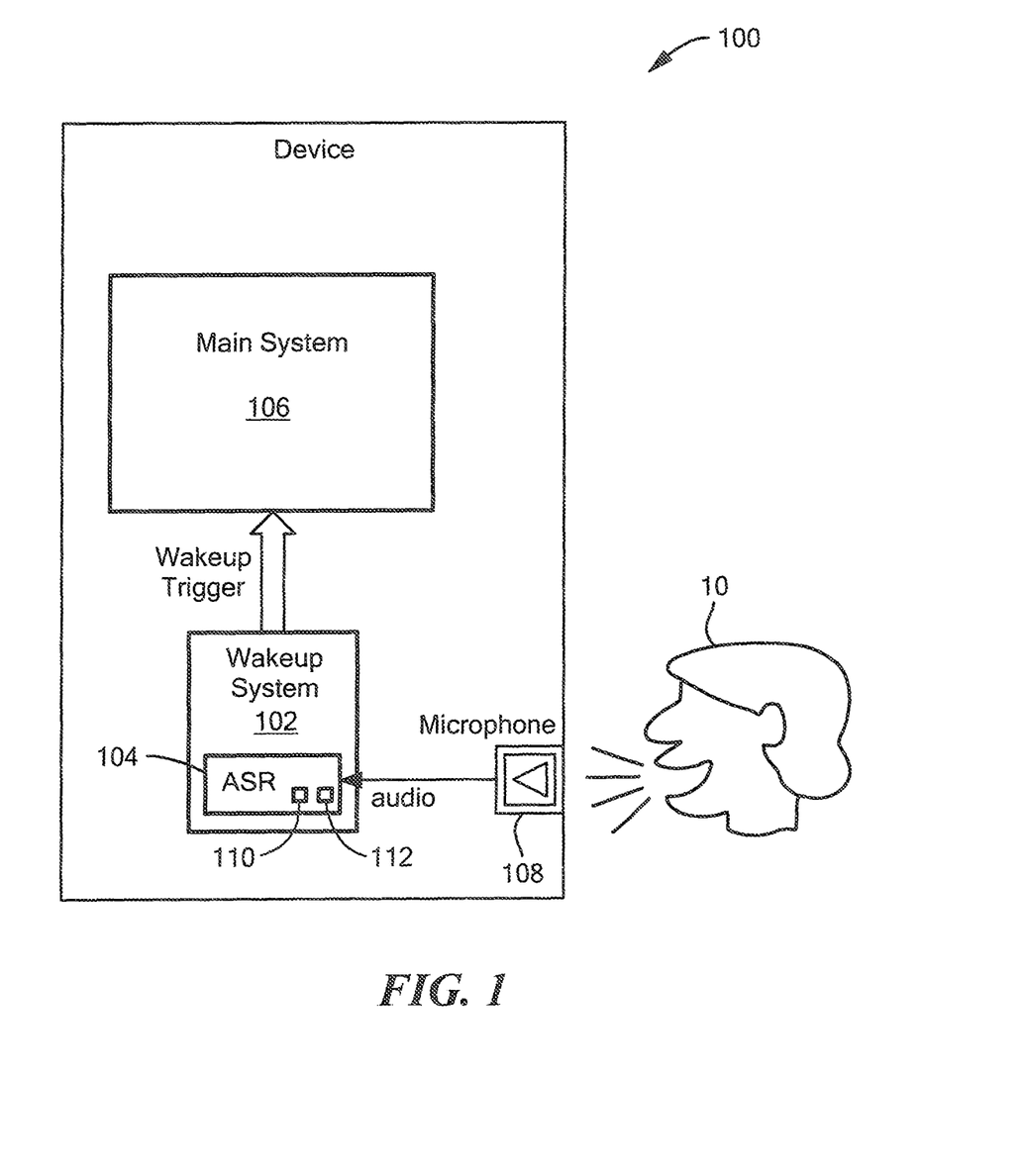
FIG. 1 is a schematic representation of a system having unsupervised wakeup.

FIG. 1 shows an illustrative high level architecture of a system 100 having an unsupervised wakeup system 102. In one embodiment, a relatively small, low power wakeup system on the device contains an automatic speech recognition (ASR) system 104 that is continuously listening to the ambient audio for a wakeup phrase. Upon detecting a wakeup phrase, a wakeup circuit wakes up the main system 106. For example, if the wakeup phrase is "Hello Dragon," then a user 10 of the device may say "Hello Dragon, call home," which is provided to the wakeup system 102 via a microphone 108. The device 100 wakes up upon receiving the wakeup phrase (Hello Dragon) and then executes the voice command ("call home") from the user.

The ASR module 104 provides voice-based wakeup functionality using an acoustic module 110 and a language module 112 to recognize speech in a manner well known in the art. In general, when a wakeup phrase is received by the device, the corresponding character string is converted to a sequence of phonemes. For each phoneme, the processing module 102 identifies neighboring phonemes to create a tri-phone that is converted into a sequence of states. Each tri-phone has a model for a sequence of acoustic states. Generally, a given tri-phone model has two or a few states: a beginning and an end, or a beginning, a middle, and an end. The result is a set of acoustic model states used for look-up in the acoustic model for scoring. Tri-phones are mapped to acoustic models or acoustic model states, thereby creating a sequence.

Figure 1A:
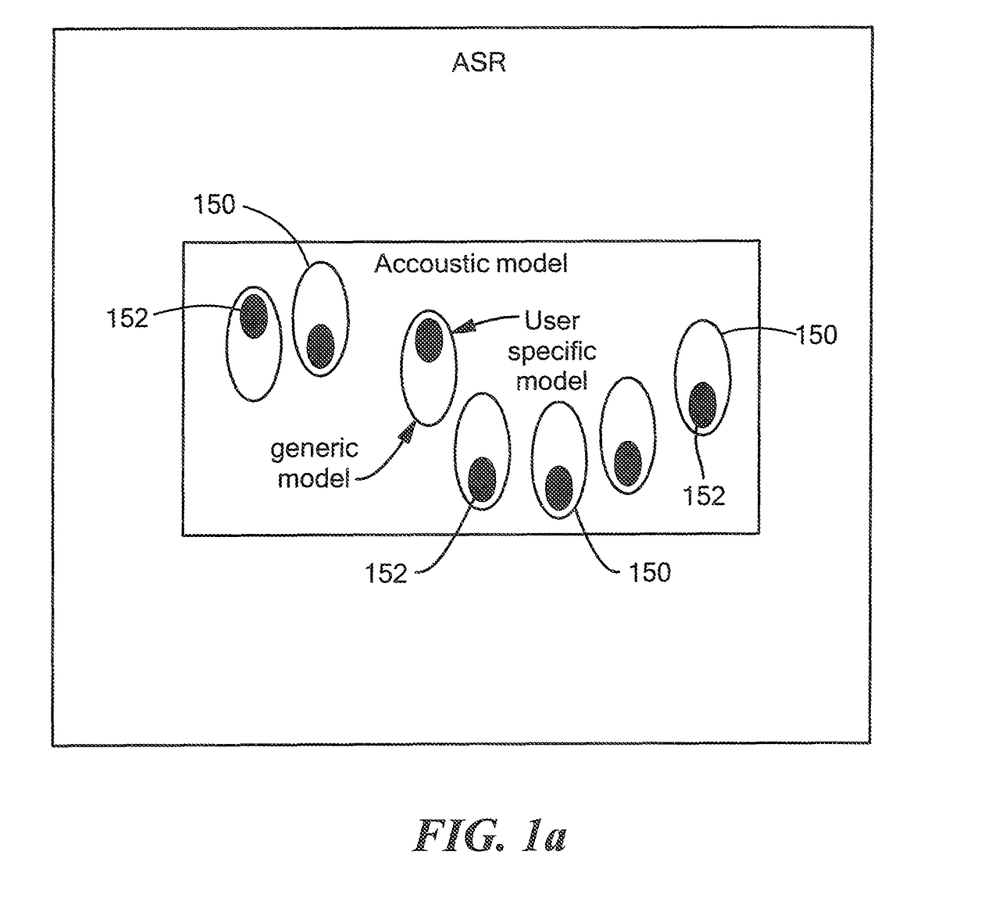
FIG. 1A illustrates generic acoustic model states and user-specific acoustic model states.

FIG. 1A illustrates generic acoustic model states 150 and user-specific acoustic model states 152. A given user only uses a small fraction of the generic models 150. In the generic model, the model parameters are used to model a wider parameter space so that sometimes the acoustics for a user are not modeled properly. In the adapted models 152, the same number of parameters as generic models are used to model only the acoustic space of the user, thus yielding a better and more robust model for that user.

In supervised adaptation, i.e., enrollment, the user is asked to speak the wakeup phrase a few, e.g., three, times. The ASR system processes the utterances and estimates the user-specific models 152. In accordance with illustrative embodiments of unsupervised adaptation, rather than asking the user to specifically provide these utterances, the system automatically identifies the wakeup utterances from user's normal usage of the wakeup system and adapts the models.

In general, adaptation helps most for users whose voice poorly matches the acoustic models e.g. non-native users. One challenge to adapt on such users is that their scores are relatively low so that it may be difficult to isolate correct utterances from noise. If the system mistakenly chooses an incorrect utterance on which to adapt, the system may corrupt the models, thus degrading performance further.

One reason why it is relatively simple to implement an algorithm for unsupervised adaptation for wakeup (as opposed to dictation, for example) is that the same wakeup phrase is repeated by the user, so that acoustic similarity can be used to isolate correct wakeups from background noise. Another reason is that adapting on only a few utterances, e.g. three or fewer, yields most of the gain. Thus, the task of unsupervised adaptation narrows down to identifying a few candidate wakeup utterances with high precision.

Figure 2A:
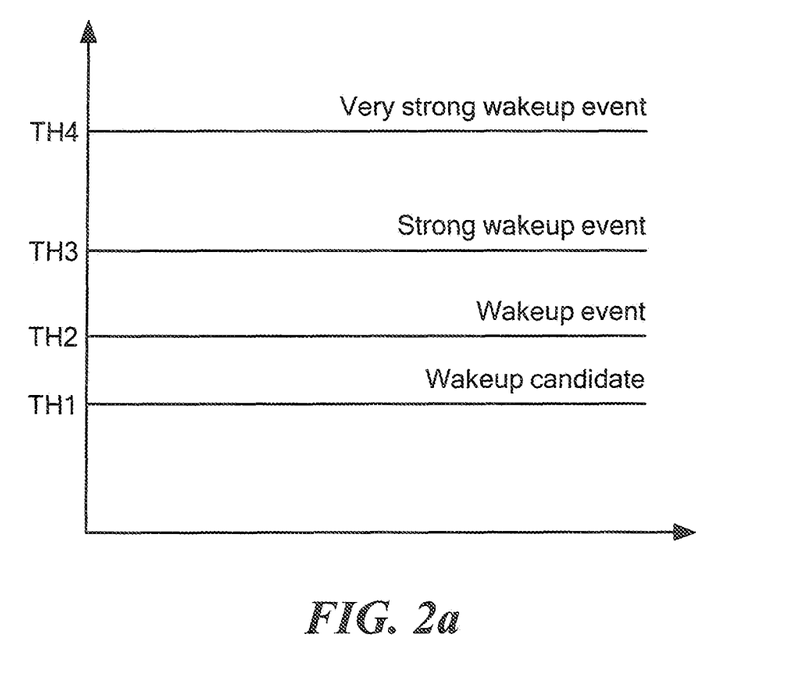
FIG. 2A is a graphical representation of thresholds for a wakeup event and a wakeup candidate.

FIG. 2A shows four thresholds as applied to a wakeup score used in an illustrative embodiment of a system, defined as follows:
TH2 is the threshold for triggering a wakeup of the system.
TH1 is a threshold lower than TH2. Any event with confidence higher than TH1 but lower than TH2 will not (by itself) trigger a wakeup, but is still considered a candidate for use in unsupervised adaptation (and in other algorithms that consider acoustic similarity between wakeup instances). We call this an "almost wakeup."
TH3 is a threshold above TH2, set high enough to eliminate a significant fraction of the FAs without impacting seriously the FR rate.
TH4 is a threshold above TH3, set high enough to eliminate virtually all FAs, potentially increasing the FR rate to a level that would be unacceptable as a wakeup threshold.

A set of thresholds can be defined that meet these criteria. In illustrative embodiments, as shown in FIG. 2a, at least a first wakeup score is defined between thresholds. For example, a first wakeup score that is a strong wakeup event would be on or above TH3 and at or below TH4.

In general, there are three situations that indicate with sufficiently high confidence that the utterance is a wakeup utterance, i.e., a wakeup event.
S1: A single "very strong" wakeup instance, with very high confidence (with score higher than TH4)
S2: One "almost wakeup" (defined above as a low confidence event, with score above TH1 but below TH2), followed by another almost or actual wakeup, where these two instances are additionally close together in time and acoustically similar.
S3: Two consecutive "strong" wakeups, with scores higher than TH3, which are acoustically similar to each other.

Acoustic similarity is a measure of how acoustically close are two recognized wakeups to each other. Consider two wakeup instances, W1 and W2. Acoustic similarity between W1 and W2 can be estimated in various ways. One way is to estimate the gain in the score of W1 when the acoustic models are adapted on W2. If W1 and W2 are indeed wakeup phrases spoken by the same user, there will be a significant improvement in score. (If either of these instances is a false accept, there is no expectation that the score will improve.)

In the case of S2, it is observed that in general, false triggers of the wakeup system are rarely acoustically similar to each other or appear close together in time. That is, a device will rarely receive acoustic events relatively close in time that are similar to each other, but not in fact the wakeup phrase. In real world scenarios, exceptions to this are quite rare—maybe once in hundreds of hours of background audio. However, if a user attempts to wake the system and does not receive a response from the device, the user will typically repeat the wakeup phrase within a few seconds, such as between three and fifteen seconds. That is, the initial user utterance and the repeated utterance of the wakeup phrase show up as wakeup candidates appearing close together in time and that are acoustically similar. This correlation can be used to reduce the likelihood of false adaptation occurring to a very low rate. Optionally, this method can be used to accurately detect a low confidence wakeup without performing acoustic model adaptation.

Figure 2B:
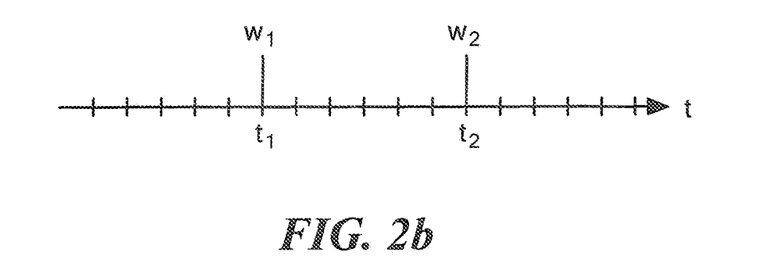
FIG. 2B is a graphical representation of first and second wakeup candidates over time.

FIG. 2B shows a first wakeup candidate W1 at time t1 that is between the first and second thresholds TH1, TH2 of FIG. 2A and a second wakeup candidate W2 at time t2 that is also between the first and second thresholds TH1, TH2. If the first and second wakeup candidates W1, W2 are within a given time interval, and are acoustically similar, then the system can adapt on the first and/or second wakeup candidate, as described more fully below.

It is understood that additional thresholds can be used for each sequential wakeup candidate and/or event to meet the needs of a particular application. In one embodiment, the threshold to determine receipt of a second wakeup candidate can be lower or higher than the second threshold TH2. In addition, after receiving a first wakeup candidate, an event threshold can be adjusted up or down for a second wakeup candidate.

S2 can be extended to a more general form. If there are multiple wakeup candidates within a time window from a current wakeup candidate, with wakeup scores greater than TH1 and less than TH2, then the system can wakeup and/or adapt on some or all the candidates.

Additionally, we can introduce acoustic similarity. If there are at least N wakeup candidates within a time window from the current wakeup candidate, which are acoustically similar to the current wakeup candidate, the system can wakeup and/or adapt on these candidates.

In a real time system, the system can wakeup only for the current candidate; but it can adapt using all the selected candidates. In a non real time system, it can either wakeup or adapt for all the selected candidates.

In case of S3, it is found that a significant fraction of wakeup utterances from most users are strong wakeups (wakeup score above TH3) whereas only a very small fraction of FAs are strong wakeups. Additionally, it is highly likely for a strong wakeup acoustically similar to a previous strong wakeup to be a correct wakeup than a FA. Hence, the probability of S3 identifying a correct wakeup rather than an incorrect wakeup is extremely high.

In a more general form, S3 can use a variable number of previous "strong" wakeups. In this case, N, previous "strong" wakeups above TH3 are selected. If the current "strong" wakeup is acoustically similar to at least a pre-determined number or fraction of these N wakeups, then the system can adapt on a those "strong" wakeups.

In case of S1, it is found that an FA is rarely a very strong wakeup. Moreover, it is also found that a significant portion of the correct wakeup utterances meet this criterion. Thus S1 also identifies correct wakeup utterances with very high precision.

Figure 3A:
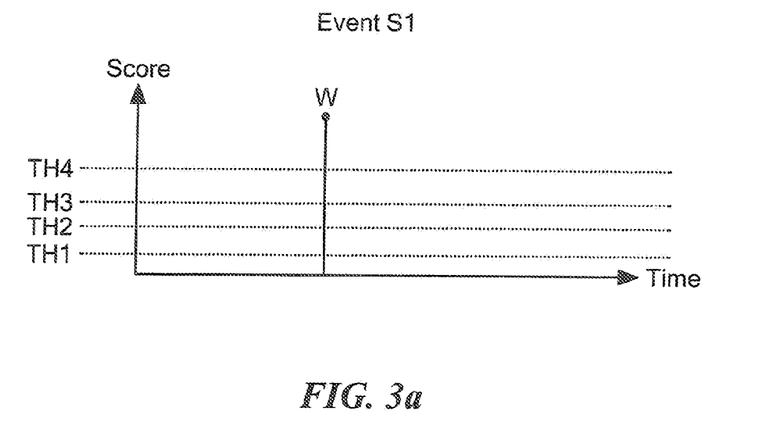
FIG. 3a is a graphical representation of score versus time with a first wakeup candidate.
Figure 3B:
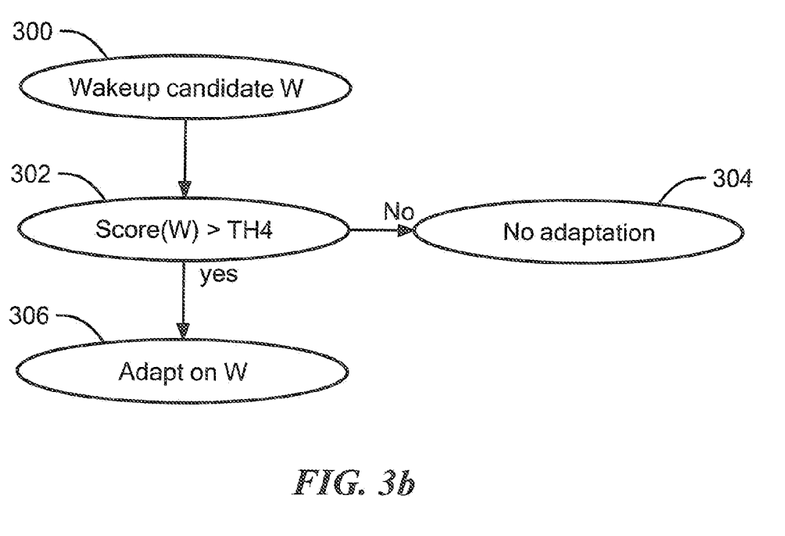
FIG. 3b is a flow diagram showing a sequence of steps for processing a first type of acoustic event.

FIG. 3a shows a wakeup candidate W with a score above TH4. FIG. 3b shows an illustrative processing sequence for the wakeup candidate. In step 300, the wakeup candidate W is received. In step 302, it is determined whether the score for the wakeup candidate W is above threshold TH4. If the score is lower than TH4, no adaptation is performed in step 304. Otherwise, in step 306, the acoustic models are adapted on the wakeup candidate W.

The system continuously listens for a region of speech, or utterance. For each such utterance a first score is generated, which measures how closely the utterance matches the acoustic models for the given wakeup phrase. For wakeup applications, a second score is generated, using a model for general speech. The difference between the first and second scores is referred to as the "wakeup score", and it measures how confident the system is that it has detected the wakeup phrase. Typically, a threshold is set such that any utterance with a score exceeding this threshold triggers a wakeup event.

Figure 3C:
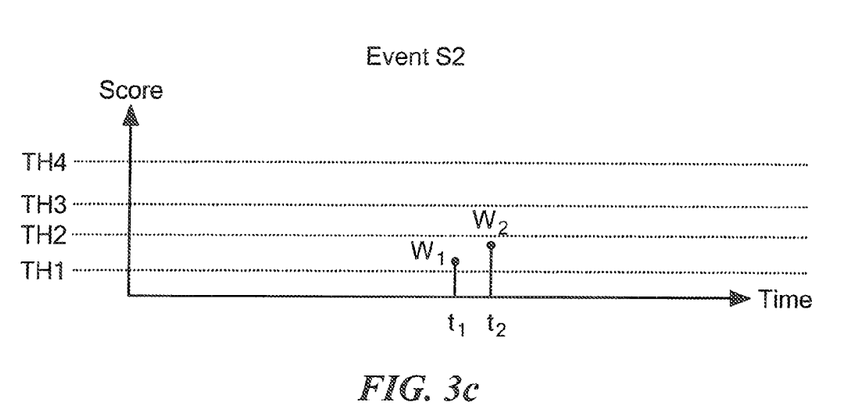
FIG. 3c is a graphical representation of score versus time with first and second wakeup candidates.

FIG. 3c shows a first wakeup candidate W1 at time t1 and a second wakeup candidate W2 at time t2. The first and second wakeup candidates W1, W2 have a score above TH1. In the illustrated embodiment, thresholds TH1, TH2, TH3, and TH4 are shown. It is understood that any practical number of thresholds can be used to meet the needs of a particular application.

Figure 3D:
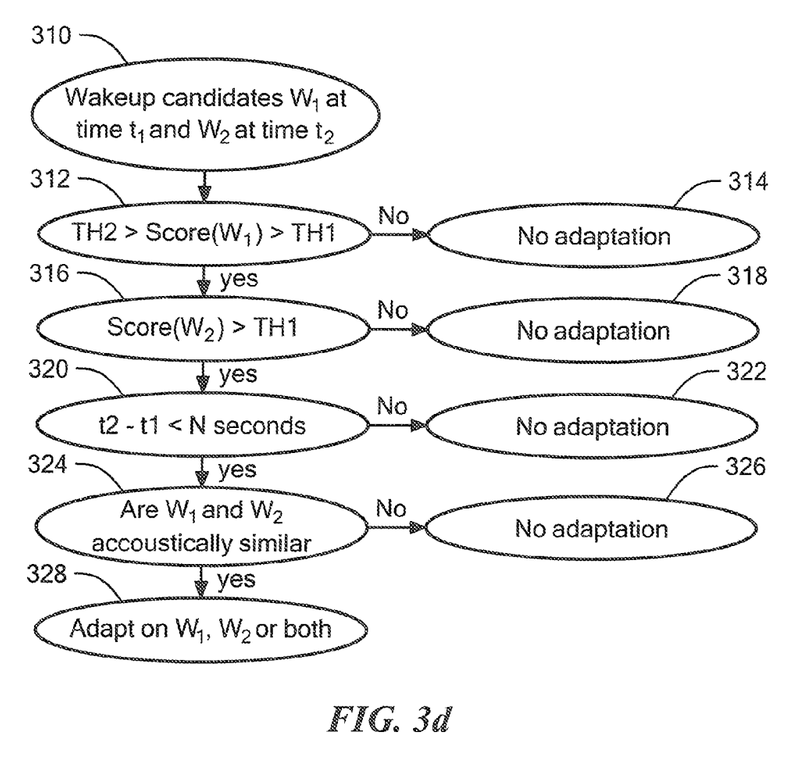

FIG. 3d shows illustrative processing for first and second wakeup candidates W1, W2 for a S2 event. In step 310, a first wakeup candidate W1 is received at time t1 and a second wakeup candidate W2 is received at time t2. In step 312, it is determined whether the score for the first wakeup candidate W1 is between TH1 and TH2. If not, in step 314 no adaptation is performed. If so, in step 316 it is determined whether the score for the second wakeup candidate W2 is greater than TH1. If not, no adaptation is performed in step 318. If so, in step 320 it is determined whether the first and second wakeup candidates W1, W2 are correlated in time, e.g., whether t2−t1<N. In general, the time interval N might be from about three to about fifteen seconds. If not, in step 322 no adaptation is performed since a wakeup phrase has apparently not been detected. If so, in step 324, it is determined whether the first and second wakeup candidates are acoustically similar. If not, in step 326, no adaptation is performed. If so, in step 328 the system adapts on the first and/or second wakeup candidates W1, W2. In one embodiment, the acoustic model adapts on the lower scoring of the first and second wakeup candidates (that is, the candidate which is a poorer match to the existing model). In general, the system adapts on first and/or second wakeup candidates which are above a given threshold, acoustically similar, and correlated in time.

Figure 3E:
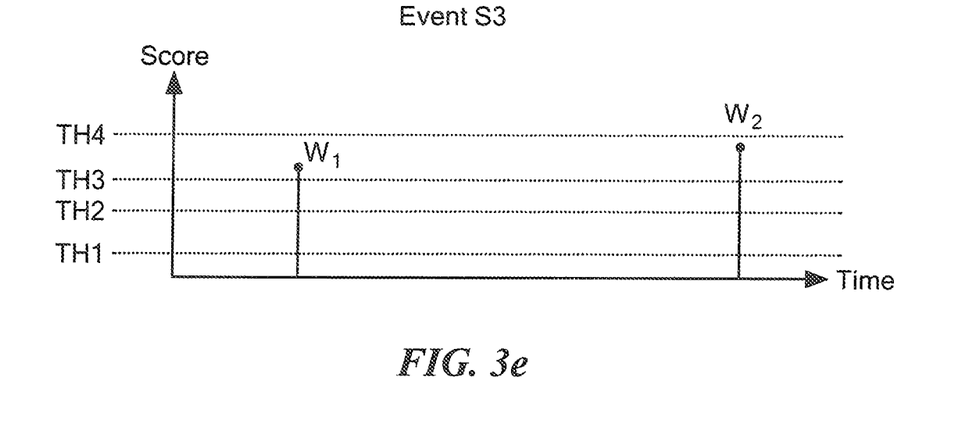
FIG. 3e is a graphical representation of score versus time with first and second wakeup candidates.

FIG. 3e shows first and second wakeup candidates W1 at time t1 and W2 at time t2. W1 and W2 may or may not be correlated in time, e.g., the first and second wakeup candidates may be several minutes or hours apart. The first and second wakeup candidates W1, W2 have relatively high scores, shown as above TH3 and below TH4.

Figure 3F:
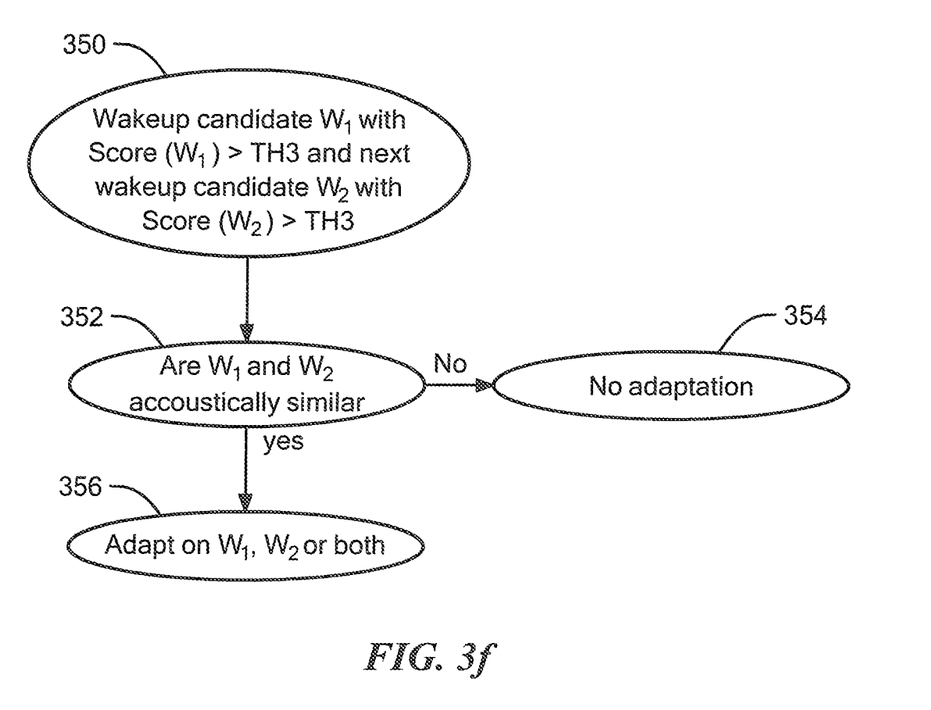
FIG. 3f is a flow diagram showing a sequence of steps for processing a third type of event for unsupervised wakeup.

FIG. 3f shows an exemplary sequence of steps to process relatively strong wakeup candidates, e.g., an S3 event. In step 350, a first wakeup candidate W1 is received at time t1 and a second wakeup candidate W2 is received at time t2, with W1 and W2 above threshold TH3. It is understood that the same or different thresholds can be used to define relatively strong wakeup candidates. In step 352, it is determined whether the first and second wakeup candidates W1, W2 are acoustically similar. If not, in step 354 no adaptation is performed. If so, in step 356, the system adapts on W1 and/or W2.

It is understood that upon detecting a wakeup event, a signal may, or may not, be generated to wakeup the device. For example, a user setting may be set to prevent wakeup events from waking up a device at certain hours of the day as part of a parental control setting. It will be appreciated that a variety of conditions may exist under which detection of a wakeup event may not result in a wakeup of a device.

By looking for correlation in time between marginal wakeup candidates, the system can improve detection of low confidence wakeups that may be difficult to detect by scores alone. For example, in a noisy environment, a user can utter a wakeup phrase that scores between event and candidate thresholds. If the user again speaks the wakeup phrase in the same noisy environment, the system can correctly identify the wakeup phrase using correlation in time. In addition, the system can adapt on the wakeup phrase to improve performance in that environment.

While false adaptations rarely score above an event threshold, even after a single correct adaptation, recognition scores of most subsequent correct wakeups are significantly above a relatively high threshold. This enables the system to keep on adapting on correct wakeup utterances so as to offset degradation from an occasional false adaptation.

In general, adaptation is relatively tolerant to contamination from false adaptation as long as the ratio of incorrect to correct adaptations ratio remains low, e.g. lower than about one time in four. Occasional incorrect adaptation in the scheme described above does not significantly degrade the acoustic models.

In another embodiment, the acoustic models can learn acoustics for multiple users, pronunciation variation, acoustic backgrounds, and the like. Usually when the acoustic model adapts on the wakeup phrase, the scores of subsequent wakeups from that user improve significantly. However, if the system detects either Events S2 or S3 again after adaptation, it may signify a new user or mismatched acoustics, and the system can adapt again. Thus, multiple users can be adapted on. We have seen that a given system can adapt on a new user without degrading performance on previously adapted users.

It is understood that embodiments of the invention can be implemented in a wide variety of device and configurations. For example, a battery powered mobile phone typically includes two processors, such as a main/primary processor and a secondary/digital signal processor (DSP). The main processor handles the bulk of the processing during active use of the phone, such as phone calls, utility applications, email, games, and the like. In one embodiment, the DSP is used to provide computation at low power. For example, the DSP is active and listens for incoming phone calls while the phone is in a standby mode or not actively being used.

In one embodiment, unsupervised wakeup functionality runs on two separate speech recognition systems on a device. A first speech system, which is relatively large, runs on the main processor of a device, and a second speech system, which is comparatively smaller, runs on the DSP. The first speech system can include a full set of speech recognition models for a particular mobile application, such as for recognizing commands to access contacts, email, songs, perform tasks, and run applications. This full set of models enables a user to be able to select a custom phrase or word for use as a spoken wakeup phrase.

The first speech system receives a wakeup phrase and uses this phrase to convert speech models and code to a relatively small system for use on the DSP. That is, the main processor pre-computes the smaller speech system, which can include a network of recognition states and acoustic model information. The network of recognition states can be used by a decoder that searches for a best path through a sequence of states. The acoustic model information can include measurements from recordings of speech. Embodiments can function well with a relatively small subset of acoustic model information used for the DSP wake-up feature. These two parts are combined together into a system that is small compared to the main processor voice recognition system.

The recognizer on the DSP then functions as a wakeup phrase detector. For example, the recognizer essentially determines whether a wakeup candidate was received. Once the DSP recognizer determines that a wakeup phrase has been uttered, the main processor recognizer becomes active. An exemplary multi-processor wakeup implementation is shown and described in U.S. Patent Publication No. 2013/0289994, which is incorporated herein by reference.

Figure 4:
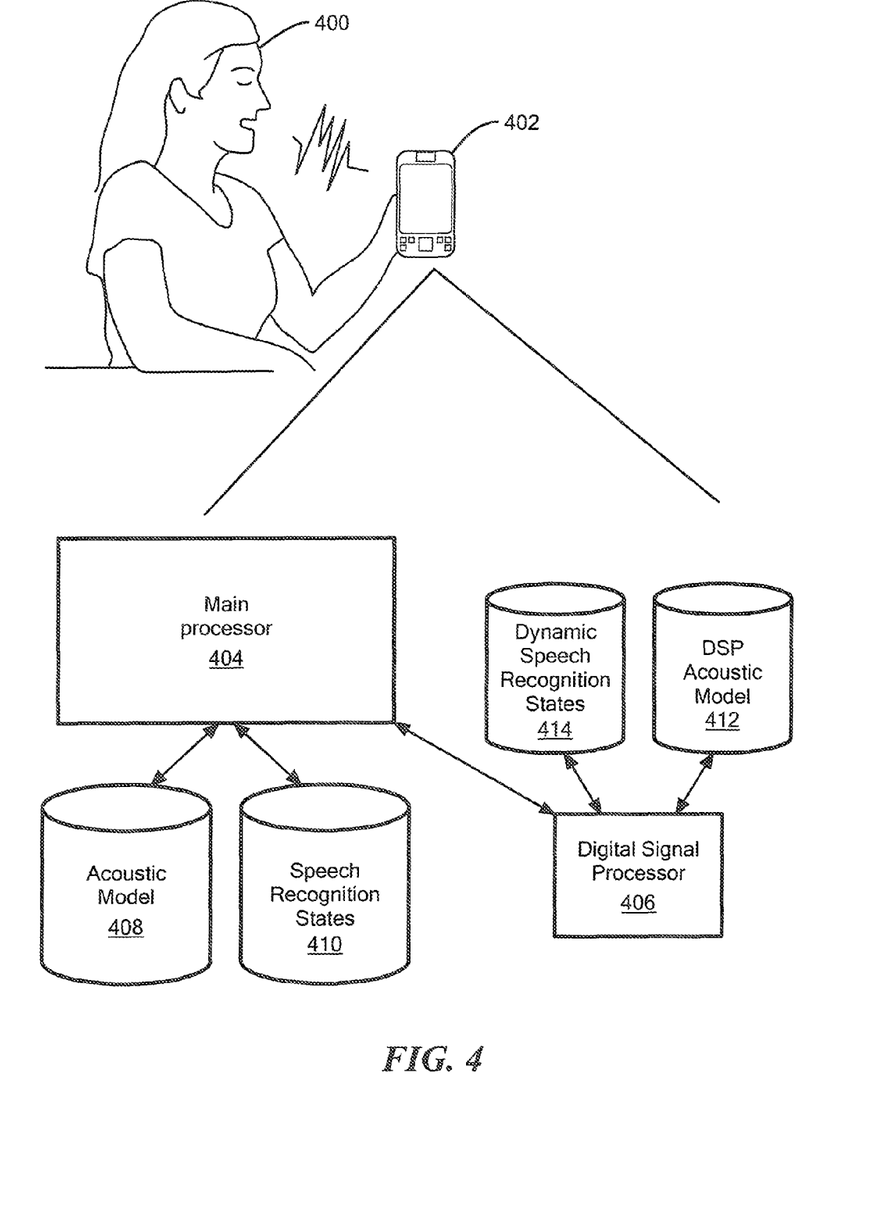
FIG. 4 shows a schematic representation of an illustrative implementation of unsupervised wakeup.

FIG. 4 shows a multi-processor implementation of wakeup functionality in accordance with illustrative embodiments of the invention. A user 400 operates an electronic device 402 having voice command functionality including a wakeup feature. The user 400 can input a particular wakeup phrase. After the user 400 enters the wakeup phrase, a main processor 404 creates a speech recognition system or state for use by a digital signal processor 406. The main processor 404 can access an acoustic model 408 and speech recognition states 410 while generating data for the wakeup functionality. The main processor 406 can gather acoustic model data from speaker-independent acoustic model 408 for use as a secondary acoustic model 412. The DSP 406 can then receive this data and store it as dynamic speech recognition states 414. During speech recognition, the DSP 406 can access both the speech recognition states 414 and the secondary acoustic model 412. The recognition feature on the DSP 406 can run while the main processor 404 is inactive, on standby, etc. After the DSP 406 detects a candidate wakeup phrase, the DSP signals the main processor 404 to become active.

Figure 5:
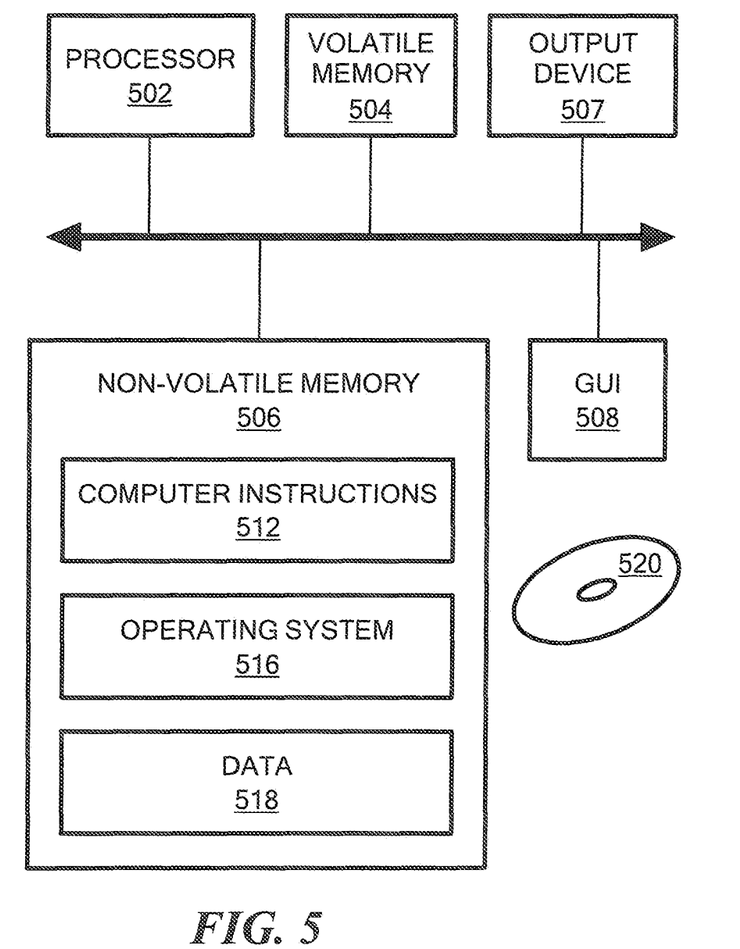
FIG. 5 is a schematic representation of an illustrative computer that can perform at least a portion of the processing described herein.

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used.

The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
  receiving a first acoustic event at a first time and a second acoustic event at a second time from a microphone of a device, wherein the first and second acoustic events have scores above a first threshold identifying the first and second acoustic events as wakeup candidates for a wakeup phrase for an unsupervised wakeup of the device;
  storing the first and second acoustic events and the first and second times in memory on the device;
  determining, using a computer processor on the device, that the first acoustic event score is below a second threshold, which is higher than the first threshold; and
  determining, using the computer processor, whether a difference between the first and second times is within a range to check for correlation in time between the first and second acoustic events; and determining that a wakeup event has occurred based upon the first and second times and performing wakeup of the device.

2. The method according to claim 1, further including determining whether the first and second acoustic events are acoustically similar and determining that the wakeup event has occurred based upon the first and second times and the determination of acoustic similarity.

3. The method according to claim 2, further including adapting an acoustic model on the first and/or second acoustic event based on the acoustic similarity determination of the first and second acoustic events.

4. The method according to claim 2, further including adapting an acoustic model on a lower scoring one of the first and second acoustic events.

5. The method according to claim 1, wherein an upper limit of the range is less than or equal to about fifteen seconds.

6. The method according to claim 1, wherein a lower limit of the range is greater than or equal to about three seconds.

7. The method according to claim 1, further including using a main processor and a lower power processor to provide the unsupervised wakeup.

8. The method according to claim 7, wherein the lower power processor identifies the first wakeup candidate.

9. The method according to claim 1, further including receiving a textual input of the wakeup phrase.

10. The method according to claim 1, further including receiving at least a third acoustic event above the first threshold and below the second threshold within the range to determine that the wakeup event has occurred.

11. The method according to claim 10, further including determining acoustic similarity of the at least a third acoustic event with at least one of the first and second acoustic events to determine that the wakeup event has occurred.

12. An article, comprising:
a non-transitory computer readable medium having stored instructions that enable a machine to:
receive a first acoustic event at a first time and a second acoustic event at a second time from a microphone of a device, wherein the first and second acoustic events have scores above a first threshold identifying the first and second acoustic events as wakeup candidates for a wakeup phrase for an unsupervised wakeup of the device;
store the first and second acoustic events and the first and second times in memory on the device;
determine, using a computer processor on the device, that the first acoustic event score is below a second threshold, which is higher than the first threshold; and
determine, using the computer processor, whether a difference between the first and second times is within a range to check for correlation in time between the first and second acoustic events; and
determine that a wakeup event has occurred based upon the first and second times and perform a wakeup of the device.

13. The article according to claim 12, further including instructions to determine whether the first and second acoustic events are acoustically similar and determining that the wakeup event has occurred based upon the first and second times and the determination of acoustic similarity.

14. The article according to claim 13, further including instructions to adapt an acoustic model on the first and/or second acoustic event based on the acoustic similarity determination of the first and second acoustic events.

15. The article according to claim 12, wherein an upper limit of the range is less than or equal to about fifteen seconds.

16. The article according to claim 12, wherein a lower limit of the range is greater than or equal to about three seconds.

17. The article according to claim 12, further including instructions for using a main processor and a lower power processor to provide the unsupervised wakeup.

18. A system, comprising:
a processor and a memory configured to:
receive a first acoustic event at a first time and a second acoustic event at a second time from a microphone of a device, wherein the first and second acoustic events have scores above a first threshold identifying the first and second acoustic events as wakeup candidates for a wakeup phrase for an unsupervised wakeup of the device;
store the first and second acoustic events and the first and second times in memory on the device;
determine, using the processor, that the first acoustic event score is below a second threshold, which is higher than the first threshold; and
determine, using the processor, whether a difference between the first and second times is within a range to check for correlation in time between the first and second acoustic events; and
determine that a wakeup event has occurred based upon the first and second times and perform a wakeup of the device.

19. The system according to claim 18, wherein the processor and memory are further configured to include determining whether the first and second acoustic events are acoustically similar and determining that the wakeup event has occurred based upon the first and second times and the determination of acoustic similarity.

20. The system according to claim 19, wherein the processor and memory are further configured to adapt an acoustic model on the first and/or second acoustic event based on the acoustic similarity determination of the first and second acoustic events.

* * * * *